United States Patent
Balus et al.

(10) Patent No.: US 9,667,539 B2
(45) Date of Patent: May 30, 2017

(54) METHOD AND APPARATUS FOR PROVIDING TRANSPORT OF CUSTOMER QOS INFORMATION VIA PBB NETWORKS

(75) Inventors: Florin Balus, Cupertino, CA (US); Senthil K. Sathappan, San Jose, CA (US); Kendall Harvey, Sunnyvale, CA (US); Neil Hart, Chelsea (CA); David Weyand, Carp (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1093 days.

(21) Appl. No.: 13/007,883

(22) Filed: Jan. 17, 2011

(65) Prior Publication Data

US 2012/0182997 A1    Jul. 19, 2012

(51) Int. Cl.
*H04L 12/721*    (2013.01)
*H04L 12/833*    (2013.01)
*H04L 12/851*    (2013.01)

(52) U.S. Cl.
CPC .......... *H04L 45/66* (2013.01); *H04L 47/2433* (2013.01); *H04L 47/31* (2013.01)

(58) Field of Classification Search
None
See application file for complete search history.

(56) References Cited

U.S. PATENT DOCUMENTS

| | | | |
|---|---|---|---|
| 6,046,979 A * | 4/2000 | Bauman | 370/229 |
| 6,901,452 B1 * | 5/2005 | Bertagna | 709/240 |
| 7,164,678 B2 * | 1/2007 | Connor | H04L 12/5693 370/392 |
| 7,164,681 B2 * | 1/2007 | Karighattam et al. | 370/394 |
| 2003/0041163 A1 * | 2/2003 | Rhoades et al. | 709/232 |
| 2004/0114536 A1 * | 6/2004 | O'Rourke | 370/252 |
| 2005/0157645 A1 * | 7/2005 | Rabie | H04L 12/2602 370/230 |
| 2005/0157729 A1 * | 7/2005 | Rabie et al. | 370/395.53 |
| 2005/0157750 A1 * | 7/2005 | Rabie | H04L 12/28 370/466 |
| 2005/0160180 A1 * | 7/2005 | Rabje et al. | 709/238 |
| 2005/0174943 A1 * | 8/2005 | Wang | H04L 12/4645 370/235 |
| 2005/0220107 A1 * | 10/2005 | DelRegno et al. | 370/392 |

(Continued)

OTHER PUBLICATIONS

IEEE Standard for Local and Metropolitan Area Networks—Virtual Bridged Local Area Networks Amendment 7: Provider Backbone Bridges; IEEE Std 802.1ah-2008; Aug. 14, 2008.

(Continued)

*Primary Examiner* — Alpus H Hsu
*Assistant Examiner* — Hooman Houshmand
(74) *Attorney, Agent, or Firm* — Tong, Rea, Bentley & Kim, LLC (57) ABSTRACT

A customer Quality-of-Service (QoS) transport capability is depicted and described herein. The customer QoS transport capability enables transparent transport of customer QoS information via a Provider Backbone Bridging (PBB) network. The customer QoS transport capability enables customer QoS information that would normally be terminated at a point of ingress to a PBB network to be transported via the PBB network transparently and recovered at a point of egress from the PBB network.

20 Claims, 4 Drawing Sheets

(56) References Cited

U.S. PATENT DOCUMENTS

| | | | |
|---|---|---|---|
| 2006/0002370 A1* | 1/2006 | Rabie | H04L 12/4645 370/351 |
| 2008/0172497 A1* | 7/2008 | Mohan et al. | 709/249 |
| 2008/0228943 A1* | 9/2008 | Balus | H04L 12/462 709/239 |
| 2008/0240113 A1* | 10/2008 | Arad et al. | 370/395.53 |
| 2009/0010160 A1* | 1/2009 | Tzeng et al. | 370/231 |
| 2009/0141703 A1* | 6/2009 | Ghodrat et al. | 370/352 |
| 2009/0316695 A1* | 12/2009 | Li et al. | 370/389 |
| 2010/0208593 A1* | 8/2010 | Soon et al. | 370/242 |
| 2010/0254258 A1* | 10/2010 | Zheng | 370/222 |
| 2010/0260100 A1* | 10/2010 | Kerr | H04L 12/66 370/328 |
| 2010/0271938 A1* | 10/2010 | Mutoh | 370/228 |
| 2011/0299414 A1* | 12/2011 | Yu et al. | 370/252 |
| 2012/0027024 A1* | 2/2012 | Liang | 370/412 |
| 2012/0051362 A1* | 3/2012 | Rabie et al. | 370/392 |
| 2012/0195596 A1* | 8/2012 | Yang | H04Q 11/0067 398/58 |
| 2012/0243545 A1* | 9/2012 | Zhang | H04L 12/4625 370/395.53 |

OTHER PUBLICATIONS

IEEE Standards; 802.1Q, IEEE Standards for Local and Metropolitan Area Networks—Virtual Bridged Local Area Networks; May 7, 2003, pp. 1-312.

IEEE P802.1ad/D5.1, Draft Standard for Local and Metropolitan Area Networks—Virtual Bridged Local Area Networks—Amendment 4: Provider Bridges; Draft Amendment to IEEE Std 802.1Q, May 12, 2005.

IEEE Std 802.1D—2004, IEEE Standard for Local and metropolitan area networks, Media Access Control (MAC) Bridges, Jun. 9, 2004.

M. Lasserre, V. Kompella, RFC: 4762, "Virtual Private LAN Service (VPLS) Using Label Distribution Protocol (LDP) Signaling," RFC: 4762, Jan. 2007.

* cited by examiner

METHOD AND APPARATUS FOR PROVIDING TRANSPORT OF CUSTOMER QOS INFORMATION VIA PBB NETWORKS

FIELD OF THE INVENTION

The invention relates generally to communication networks and, more specifically but not exclusively, to enabling transport of customer quality-of-service (QoS) information via a Provider Backbone Bridging (PBB) network.

BACKGROUND

In general, metropolitan and wide area communication networks are often used for interconnecting Local Area Networks (LANs). In previous implementations, metropolitan and wide area communication networks were often based upon technologies such as Asynchronous Transfer Mode (ATM), Synchronous Optical Network (SONET), and Frame Relay (FR) technologies, which were optimized for voice communications services. With the increased use of the Internet as a communications medium, non-voice traffic (typically referred to as data traffic) is becoming the most prevalent type of network traffic. In order to meet the increasing demand for data communications services in metropolitan and wide areas, many newer metropolitan and wide area communication networks utilize Ethernet, at Layer 2 of the Open System Interconnection (OSI) model, to connect nodes within the network. Ethernet is a popular Layer 2 protocol for use in such networks, primarily due to its compatibility with the installed base of end users, its compatibility with Internet Protocol (IP), its overall flexibility, and its cost (e.g., it is relatively cheap to deploy as compared to other Layer 2 technologies such as ATM, SONET, and FR).

While the use of Ethernet as the Layer 2 technology in metropolitan and wide area communication networks has many advantages as described above, use of Ethernet as the Layer 2 technology in metropolitan and wide area communication networks has disadvantages. For example, end user customers, such as businesses, that are targeted to utilize metropolitan and wide area communication networks often desire advanced network services, such as quality of service (QoS) guarantees, permanent virtual circuits (PVCs), Virtual Leased Lines (VLLs), transparent LAN services (TLS), and the like. While many of these advanced services can be provided by a network that utilizes a Layer 2 technology such as ATM, SONET, or FR, Ethernet, on the other hand, was not originally designed to provide advanced services and, as a result, solutions to customer needs can be more difficult to implement in Ethernet-based networks.

One Ethernet technology that is presently utilized in many metropolitan and wide area communication networks to provide advanced services to customers is Virtual LAN (VLAN) technology. A VLAN is a group of network devices on different physical LAN segments that can communicate with each other as if they are on the same physical LAN segment. In general, network devices, and the respective network traffic of those network devices, can be mapped into VLAN groups using various types of VLAN mappings, e.g., port-based VLAN mapping, Media Access Control (MAC) address-based VLAN mapping, protocol-based VLAN mapping, IP subnet-based VLAN mapping, application-based VLAN mapping, and explicit VLAN tagging, and the like, as well as combinations thereof.

A widely accepted standard for implementing explicit VLAN tagging within an Ethernet network is defined by in the Institute of Electrical and Electronics Engineers (IEEE) 802.1Q standard. In general, implementation of 802.1Q VLANs involves tagging packets with a Tag Control Information field that identifies the VLAN to which the packets belong. According to the IEEE 802.1Q standard, the Tag Control Information field includes a 12-bit VLAN Identifier (VID) field that enables VLANs to be uniquely identified. In addition to the IEEE 802.1Q standard, the IEEE 802.1ad standard (denoted as the Provider Bridge specification) defines an approach, often referred to as Q-in-Q, in which VLAN tags may be "stacked" to allow not only separation of customer traffic, but differential treatment of customer traffic within the service provider network.

In addition to the above-described Ethernet technologies, Provider Backbone Bridging (PBB), as defined in the IEEE 802.1ah standard, is an Ethernet-based technology that enables layering of the underlying network into customer and provider domains with isolation between customer MAC addresses and provider MAC addresses. In general, the IEEE 802.1ah standard defines an approach of encapsulating customer Ethernet frames using a service provider header that includes a backbone source address (B-SA), a backbone destination address (B-DA), a backbone VLAN ID (B-VID), and a service instance ID (I-SID). As a result, the IEEE 802.1ah standard allows for "MAC tunneling" encapsulation and bridging of frames across a PBB network.

Disadvantageously, however, customer QoS indicators enabled by standards such as the IEEE 802.1Q standard and the IEEE 802.1ad standard cannot currently be transported across PBB networks.

SUMMARY

Various deficiencies in the prior art are addressed by embodiments for enabling transport of customer quality-of-service (QoS) information across a Provider Backbone Bridging (PBB) network.

In one embodiment, a method for transporting QoS information includes receiving, at a provider edge (PE) device configured as an ingress point to a PBB network, a customer Ethernet frame including a customer header having customer QoS information, extracting the customer QoS information from the customer header of the received customer Ethernet frame, and adding the customer QoS information to a service provider header configured for use in transporting the customer Ethernet frame via the PBB network.

In one embodiment, a method for transporting QoS information includes receiving, at a provider edge (PE) device configured as an egress point from a PBB network, a PBB encapsulated frame where the PBB encapsulated frame includes a customer Ethernet frame and a service provider header and where the service provider header includes customer QoS information associated with the customer Ethernet frame, extracting the customer QoS information from the service provider header of the received PBB encapsulated frame, and adding the extracted customer QoS information within a customer header of the customer Ethernet frame.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

A customer QoS transport capability is depicted and described herein. The customer QoS transport capability enables transparent transport of customer QoS information via a Provider Backbone Bridging (PBB) network. The customer QoS transport capability enables customer QoS information that would normally be terminated at a point of ingress to a PBB network to be transported via the PBB network transparently and recovered at a point of egress from the PBB network.

Although primarily depicted and described herein with respect to use of the customer QoS transport capability for transparently transporting customer QoS information via a PBB network, it will be appreciated that the customer QoS transport capability may be used for transparently transporting customer QoS information via various other types of networks.

Figure 1:
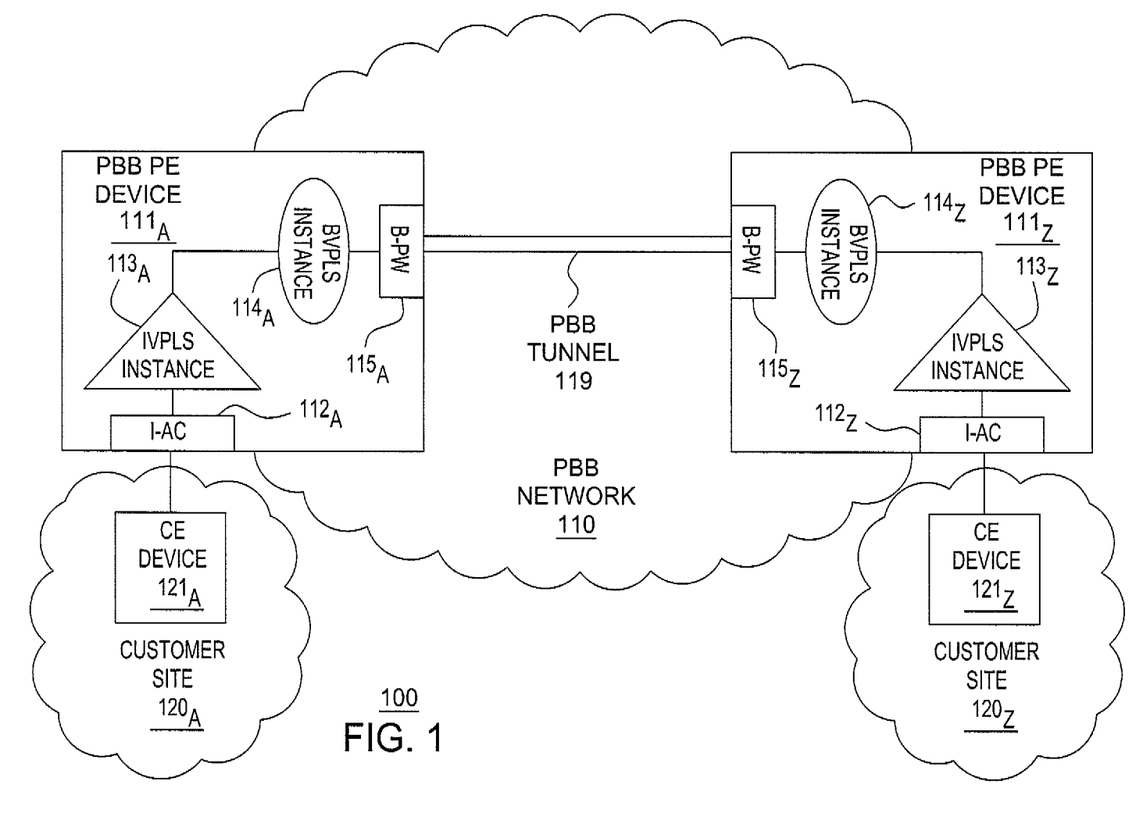
FIG. 1 depicts an exemplary communication system illustrating use of a PBB network to transport customer data between customer sites.

FIG. 1 depicts an exemplary communication system illustrating use of a PBB network to transport customer data between customer sites.

As depicted in FIG. 1, exemplary communication system 100 includes a PBB network 110 configured for transporting customer data between a pair of customer sites $120_A$ and $120_Z$ (collectively, customer sites 120).

In one embodiment, PBB network 110 is a PBB network as described in the IEEE 802.1ah standard (Provider Backbone Bridging), which is hereby incorporated herein by reference in its entirety.

The PBB network 110 includes a pair of PBB Provider Edge (PE) devices $111_A$ and $111_Z$ (collectively, PBB PE devices 111), where PBB PE device $111_A$ provides an interface to PBB network 110 for customer site $120_A$ and PBB PE device $111_Z$ provides an interface to PBB network 110 for customer site $120_Z$.

The customer sites 120 may be any type of customer sites suitable for interfacing with a PBB network such as PBB network 110. As depicted in FIG. 1, customer site $120_A$ includes a customer edge (CE) device $121_A$ configured for interfacing with PBB PE device $111_A$ and customer site $120_Z$ includes a customer edge (CE) device $121_Z$ configured for interfacing with PBB PE device $111_Z$ (where CE devices $121_A$ and $121_Z$ may be referred to collectively as CE devices 121). Although omitted for purposes of clarity, it will be appreciated that each of the customer sites 120 may include various devices which communicate with the respective CE devices 121 for communicating via PBB network 110.

The customer sites 120 exchange customer traffic via one or more customer VLANs transported via the PBB network 110. For example, each of the customer sites 120 may include multiple end user devices exchanging customer traffic, using one or more customer VLANs, within the context of one or more applications supported on the end user devices (e.g., data, voice, video, and the like, as well as various combinations thereof). The typical use of customer VLANs for transporting customer traffic via a PBB network will be understood by one skilled in the art.

In general, each PBB PE device 111 is configured to interface an IVPLS instance (customer-facing instance associated with a customer site 120) with a BVPLS instance (backbone-facing instances associated with PBB network 110), enabling PBB encapsulation and decapsulation to be performed for supporting PBB tunneling of customer traffic via PBB network 110 (as illustrated by the PBB tunnel 119 between PBB PE device $111_A$ and PBB PE device $111_Z$).

As depicted in FIG. 1, each PBB PE device 111 includes a customer-facing Attachment Circuit (I-AC) 112 which is an attachment circuit in the PBB I-component context, a customer-facing VPLS (IVPLS) instance 113, a backbone/provider-facing VPLS (BVPLS) instance 114, and a backbone/provider-facing Pseudowire (B-PW) 115 which is a pseudowire instantiated in the PBB backbone component context or backbone VPLS context. The I-AC 112 is connected to the associated CE device 121 and the IVPLS interface 113, the IVPLS instance 113 is connected to the I-AC 112 and the BVPLS instance 114, the BVPLS instance 114 is connected to the IVPLS instance 113 and the B-PW 115, and the B-PW 115 is connected to the BVPLS instance 114 and a core provider backbone device of the PBB network 110 (omitted for purposes of clarity).

In the ingress direction, for ingress of customer Ethernet frames from a customer site 120 into the PBB network 110: (1) I-AC 112 receives the customer Ethernet frames from the CE device 121 and provides the customer Ethernet frames to IVPLS instance 113, (2) IVPLS instance 113 receives the customer Ethernet frames from I-AC 112 and provides the customer Ethernet frames to BVPLS instance 114, (3) BVPLS instance 114 receives the customer Ethernet frames from IVPLS instance 113, PBB encapsulates the customer Ethernet frames to form PBB frames for PBB tunneling of the customer Ethernet frames via PBB network 110, and provides the PBB frames to B-PW 115, and (4) B-PW receives the PBB frames from BVPLS instance 114 and propagates the PBB frames via PBB network 110. For example, I-AC $112_A$, IVPLS instance $113_A$, BVPLS instance $114_A$, and B-PW $115_A$ may operate in this manner for customer Ethernet frames received from CE device $121_A$ of customer site $120_A$ and, similarly, I-AC $112_Z$, IVPLS instance $113_Z$, BVPLS instance $114_Z$, and B-PW $115_Z$ may operate in this manner for customer Ethernet frames received from CE device $121_Z$ of customer site $120_Z$.

In the egress direction, for egress of customer Ethernet frames from PBB network 110 to a customer site 120: (1) B-PW 115 receives the PBB frames from PBB network 110 and provides the PBB frames to BVPLS instance 114, (2) BVPLS instance 114 receives the PBB frames from B-PW 115, decapsulates the customer Ethernet frames from within the PBB frames, and provides the customer Ethernet frames to IVPLS instance 113, (3) IVPLS instance 113 receives the customer Ethernet frames from BVPLS instance 114 and provides the customer Ethernet frames to I-AC 112, and (4) I-AC 112 receives the customer Ethernet frames from IVPLS instance 113 and propagates the customer Ethernet frames toward the CE device 121 of the customer site 120. For example, B-PW $115_A$, BVPLS instance $114_A$, IVPLS instance $113_A$, and I-AC $112_A$ may operate in this manner for received PBB frames transporting customer Ethernet frames intended for CE device $121_A$ of customer site $120_A$ and, similarly, B-PW $115_Z$, BVPLS instance $114_Z$, IVPLS instance $113_Z$, and I-AC $112_Z$ may operate in this manner for received PBB frames transporting customer Ethernet frames intended for CE device $121_Z$ of customer site $120_Z$.

Although primarily depicted and described with respect to specific functions being performed by the components of the PBB PE devices 111 (e.g., I-AC 112, IVPLS instance 113, BVPLS instance 114, and B-PW 115), it will be appreciated that the described functions may be distributed across the components of the PBB PE devices 111 in any other suitable manner.

The typical operation of the PBB PE devices 111, including the various components of the PBB PE devices 111, may be better understood by way of reference to the IEEE 802.1ah standard (Provider Backbone Bridging), the RFC 4762 standard (Virtual Private LAN Services (VPLS)), and the IEEE 802.1Q standard (VLAN Tagging), each of which is hereby incorporated herein by reference in its entirety.

As described herein, customer Ethernet frames may be propagated between customer sites 120 via PBB network 110. The customer Ethernet frames include customer payload data and customer header information. The customer payload data of the customer Ethernet frame may include any suitable types of data which may be transported using any suitable protocol(s), e.g., text, audio, video, and the like, as well as various combinations thereof. The customer header information of the customer Ethernet frame includes one or more associated customer header fields, such as one or more 2-byte Ethernet Type (EthType) fields, a Customer VLAN ID (C-VID) field, a Service VLAN ID (S-VID), Customer Source and Destination MAC Address (C-SA and C-DA) fields, and the like. The typical arrangement and usage of such customer header fields will be understood by one skilled in the art.

As further described herein, customer QoS information may be associated with customer Ethernet frames being transmitted from customer sites 120. For example, customer QoS information may be included within the customer headers of customer Ethernet frames.

The customer QoS information may include any information which may be associated with customer Ethernet frames within an Ethernet environment.

In one embodiment, for example, the customer QoS information for a customer Ethernet frame may include Ethernet dot1p bits. For example, the IEEE 802.1Q standard, which defines a mechanism for the trunking of VLANs between switches, includes support for indicating priority in an Ethernet frame. The IEEE 802.1Q standard adds a 4-byte 802.1Q field into the Ethernet frame, where the 4 bytes of the 802.1Q field include a 2-byte Ethernet Tag Type (EthType) field and a 2-byte Tag Control Information (TCI) field. Within the 2-byte TCI field are 3 bits that set the priority of the Ethernet frame. These 3 priority bits are commonly referred to as IEEE 802.1p bits or, more commonly, dot1p bits (i.e., dot1p is a term typically used to identify support for this priority mechanism), and also may be referred to as Class of Service (CoS) bits.

In one embodiment, for example, the customer QoS information for a customer Ethernet frame may include a Drop Eligibility Indication (DEI) bit.

The customer QoS information may include any other QoS information which may be tagged within a customer frame in an Ethernet environment.

The customer QoS information may include various combinations of such QoS information which may be tagged within a customer frame in an Ethernet environment.

As described herein, each of PBB PE devices 111 performs PBB encapsulation, whereby each customer Ethernet frame received from an associated customer site 120 is encapsulated using a service provider header for the PBB 110 that is adapted for use in tunneling the customer Ethernet frame via the PBB network 110. The service provider header for the PBB 110 may include one or more PBB header fields as will be understood by one skilled in the art. As part of the PBB encapsulation process, a portion of the customer header fields of the customer Ethernet frames are stripped by the PBB PE device 111. As described herein, one of the customer header fields stripped from each customer Ethernet frame is the VLAN tag that includes the customer QoS information for the customer Ethernet frame (e.g., including dot1p bits, the DEI bit, and the like).

In existing PBB networks, a result of the PBB encapsulation process is that customer QoS information is terminated at the ingress PBB PE device, i.e., VLAN tags of customer Ethernet frames (including VLAN tags such as the a 4-byte 802.1Q field which is used to indicate customer QoS information) are stripped from the customer Ethernet frame at the ingress PBB PE device. For example, for a customer Ethernet frame that is transmitted from customer site $120_A$ to customer site $120_Z$, the customer QoS information included in the customer Ethernet frame when transmitted from customer site $120_A$ to PBB PE device $111_A$ is terminated at PBB PE device $111_A$ and cannot be recovered at PBB PE device $111_Z$ before the customer Ethernet frame is provided from PBB PE device $111_Z$ to customer site $120_Z$ (i.e., the customer QoS information specified in customer site $120_A$ is not received at customer site $120_Z$ and, thus, cannot be used to provide QoS functions within customer site $120_Z$). Similarly, customer QoS information would be lost for customer Ethernet frames transmitted from customer site $120_Z$ to customer site $120_A$.

In one embodiment, the typical operation of PBB PE devices in existing PBB networks is modified to provide support for the customer QoS transport capability (illustratively, each of the PBB PE devices 111 is configured to provide support for the customer QoS transport capability), thereby enabling the PBB network 110 to support transparent transport of customer QoS information via PBB network 110 such that customer QoS information that would normally be terminated at a point of ingress to PBB network 110 can be transported via the PBB network 110 transparently and recovered at a point of egress from the PBB network 110. In this manner, customer QoS information specified within customer site $120_A$ is transported to customer site $120_Z$ and, similarly, customer QoS information specified within customer site $120_Z$ is transported to customer site $120_A$.

In one embodiment, customer QoS information is transported via PBB network 110 by configuring the PBB PE devices 111 to support preservation of customer QoS information within PBB network 110.

In one embodiment, to enable transport of customer QoS information via PBB network 110, a PBB PE device 111 configured as an ingress point to PBB network 110 for customer Ethernet frames performs a process including identifying customer QoS information from one or more customer header fields of a customer Ethernet frame, adding the customer QoS information to a service provider header (e.g., using one or more service provider tags) in conjunction with PBB encapsulation of the customer Ethernet frame to form the PBB frame, and propagating the PBB frame via the BVPLS instance 115 for tunneling via PBB network 110. This process may be performed by one or more components of the ingress PBB PE device 111 (e.g., one or more of I-AC 112, IVPLS instance 113, BVPLS instance 114, and B-PW 115). In one embodiment, for example, prior to stripping of the customer header fields of the customer Ethernet frame by the IVPLS 113, the IVPLS 113 identifies the customer QoS information from the customer header of the customer Ethernet frame and provides the customer QoS information to the BVPLS instance 114 which then adds the customer QoS information to the associated service provider header during PBB encapsulation of the customer Ethernet frame.

In one embodiment, to enable transport of customer QoS information via PBB network 110, a PBB PE device 111 configured as an egress point from PBB network 110 for customer Ethernet frames performs a process including identifying customer QoS information from the service provider header of the PBB frame, extracting the customer QoS information from the service provider header (e.g., from one or more service provider tags) of the PBB frame in conjunction with PBB decapsulation of the customer Ethernet frame from the PBB frame, and adding the customer QoS information to one or more customer header fields of the customer Ethernet frame decapsulated from the PBB frame. This process may be performed by one or more components of the egress PBB PE device 111 (e.g., one or more of B-PW 115, BVPLS instance 114, IVPLS instance 113, and I-AC 112). In one embodiment, for example, prior to stripping of the service provider header fields of the PBB frame by the BVPLS instance 114, the BVPLS instance 114 extracts the customer QoS information from the service provider header of the PBB frame during PBB decapsulation of the customer Ethernet frame from the PBB frame and provides the customer QoS information to the IVPLS instance which adds the customer QoS information to the associated customer header of the customer Ethernet frame.

In at least some such embodiments, the one or more header fields of the customer Ethernet frame, from which customer QoS information may be identified at the ingress PBB PE device 111 and to which customer QoS information may be added at the egress PBB PE device, may include the 4-byte 802.1 Q field and/or any other suitable customer header fields.

In at least some such embodiments, the service provider tag(s), into which the customer QoS information is added at the ingress PBB PE device 111 and from which the customer QoS information is extracted at the egress PBB PE device 111, may be implemented using any suitable tag(s). In one embodiment, for example, the service provider tag is an IEEE VLAN tag.

In at least some such embodiments, the service provider tag(s), into which the customer QoS information is added at the ingress PBB PE device 111 and from which the customer QoS information is extracted at the egress PBB PE device 111, may be located in any suitable position within the service provider header used to encapsulate the customer Ethernet frame. In one embodiment, for example, the service provider tag follows the Customer Source and Destination MAC Addresses (C-SA, C-DA) of the customer Ethernet frame, although it will be appreciated that other suitable arrangements may be used.

Figure 2:
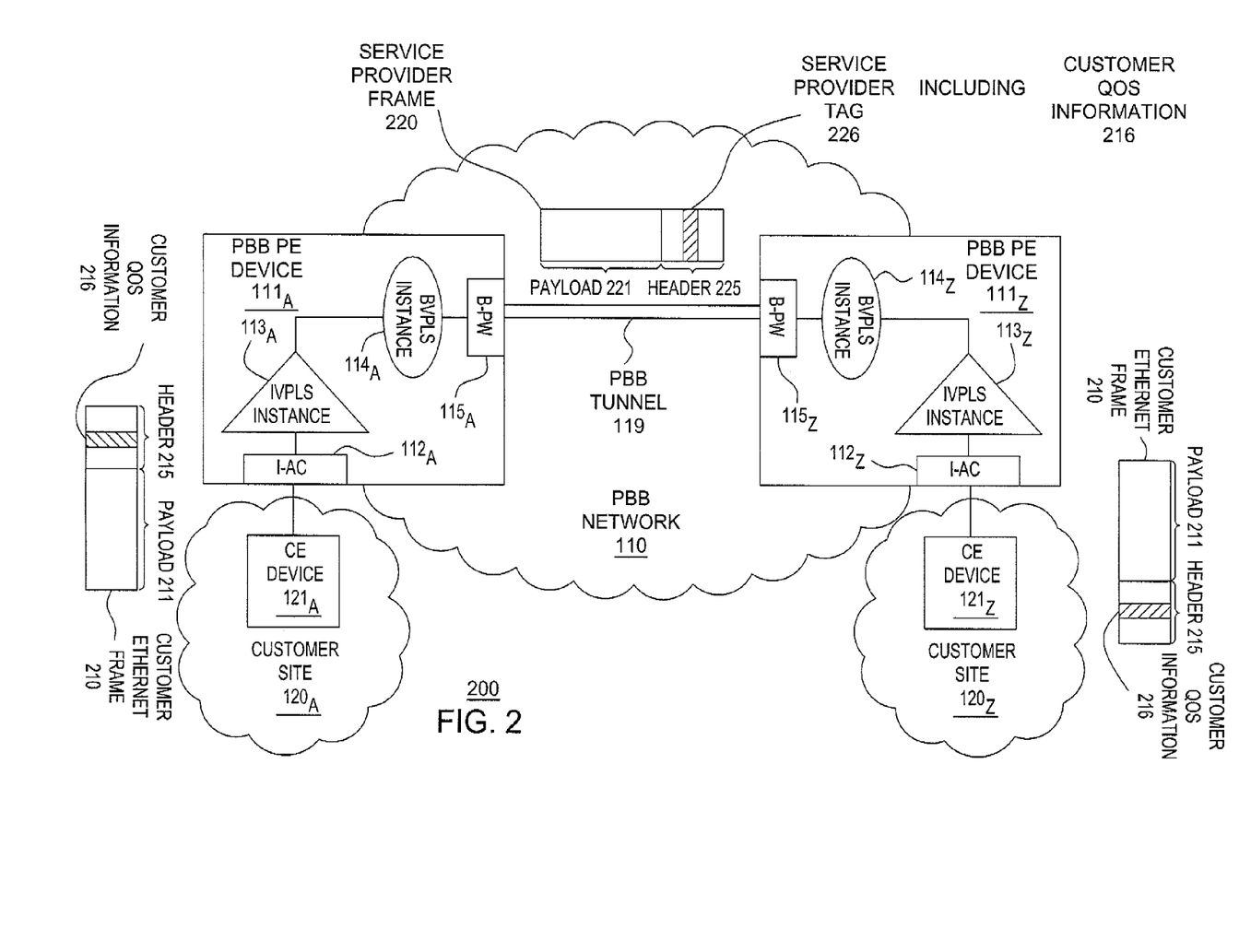
FIG. 2 depicts the exemplary communication system of FIG. 1, illustrating transport of customer QoS information via the PBB network of FIG. 1.

The tunneling of customer Ethernet frames via PBB network 110 and the associated use of the customer QoS transport capability to enable PBB network 110 to support transparent transport of customer QoS information may be better understood by way of reference to the example of FIG. 2.

FIG. 2 depicts the exemplary communication system of FIG. 1, illustrating transport of customer QoS information via the PBB network of FIG. 1.

As depicted in FIG. 2, a customer Ethernet frame 210 is transported via PBB tunnel 119 of PBB network 110. The CE device $121_A$ transmits customer Ethernet frame 210 to PBB PE device $111_A$ and the CE device $121_Z$ receives customer Ethernet frame 210 from PBB PE device $111_Z$.

The customer Ethernet frame 210 includes a customer payload 211 and a customer header 215. The customer payload 211 may include any suitable information (e.g., text, audio, video, and the like, as well as various combinations thereof). The customer header 215 includes customer QoS information 216 (e.g., one or more of dop1p bits, a DEI bit, and the like, as well as various combinations thereof). It will be appreciated that the customer header 215 will include one or more other customer header fields (e.g., one or more EtherType fields, Customer Source and Destination MAC Addresses (C-SA, C-DA), and the like, each of which is omitted for purposes of clarity).

The PBB PE device $111_A$ and PBB PE device 111 perform a PBB encapsulation process and a PBB decapsulation process, respectively, where each is configured for preserving the customer QoS information 216 for transport via PBB tunnel 119 of the PBB network 110. As a result, a service provider frame 220 (also referred to herein as a PBB frame) is transported via PBB tunnel 119 of the PBB network 110. The service provider frame 220 includes a service provider payload 221 and a service provider header 225. The service provider payload 221 includes customer payload 211 and, optionally, one or more of the customer header fields of customer header 215 (excluding the customer QoS information 216). The service provider header 225 includes a service provider tag 226 which includes the customer QoS information 216. It will be appreciated that the service provider header 226 will include one or more other service provider header fields for use in routing the service provider frame 220 via the PBB network 110 (e.g., an I-TAG including an IVPLS Backbone Service Identifier (I-SID), one or more EtherType fields, a B-VID, Backbone Source and Destination MAC Addresses (B-SA, B-DA), and the like, each of which is omitted for purposes of clarity).

The PBB PE device $111_A$ receives customer Ethernet frame 210 from CE device $121_A$ and produces service provider frame 220 using a PBB encapsulation process. The PBB PE device $111_A$ identifies the customer QoS information 216 within customer header 215 of customer Ethernet frame 210 and adds the customer QoS information 216 into the service provider tag 226 of service provider header 225 of service provider frame 220.

The PBB PE device $111_Z$ receives the service provider frame 220 from PBB PE device $111_A$ and recovers the customer Ethernet frame 210 from the service provider frame 220 using a PBB decapsulation process. The PBB PE device $111_Z$ extracts the customer QoS information 216 from service provider tag 226 of service provider header 215 of service provider frame 220 and adds the customer QoS information 216 into the customer header 215 of the customer Ethernet frame 210 recovered from service provider frame 220.

In this manner, the customer QoS information 216 is preserved as the customer Ethernet frame 210 is transported via PBB network 110.

Figure 3:
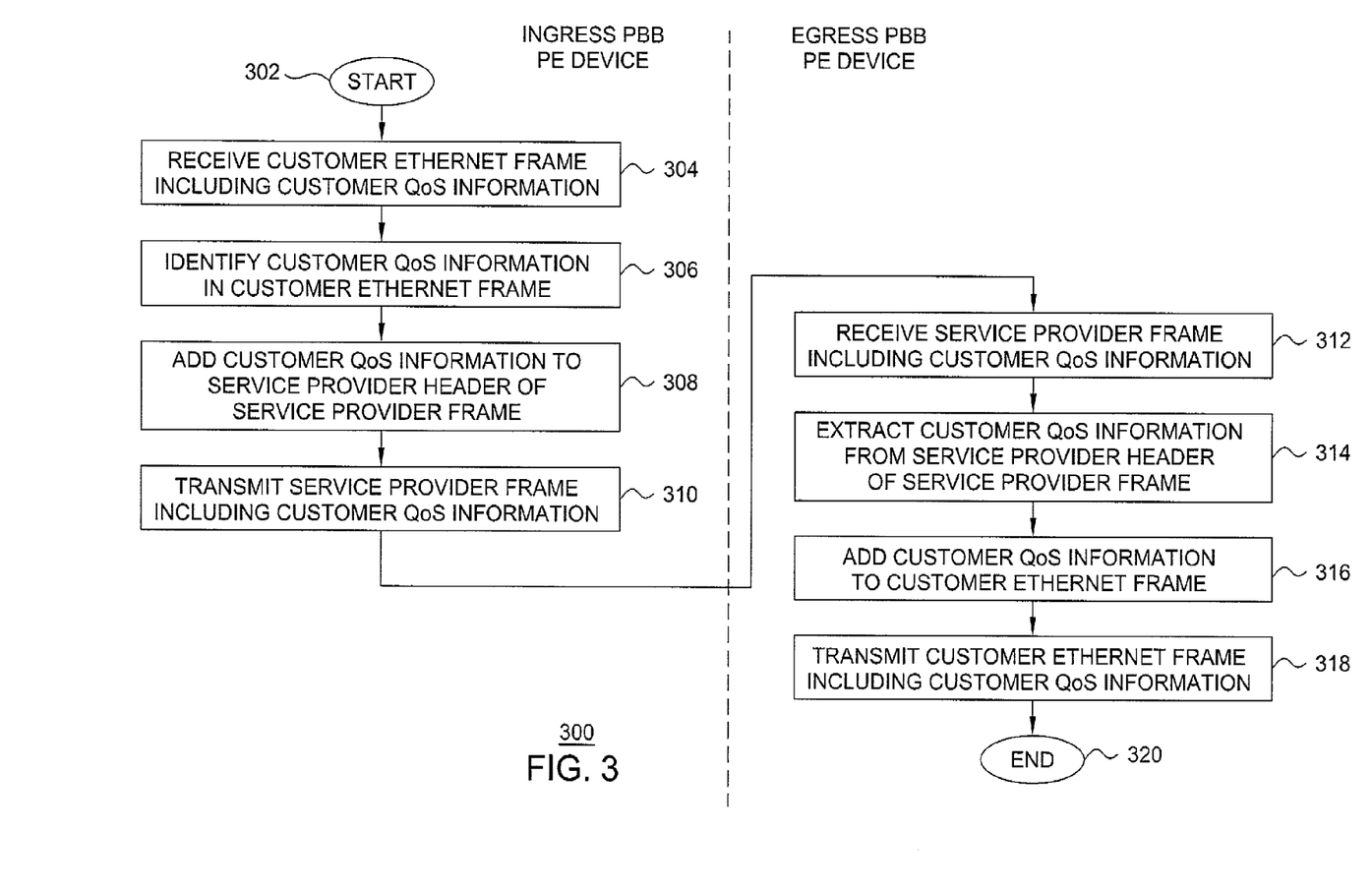
FIG. 3 depicts one embodiment of a method for transporting customer QoS information via a PBB network.

FIG. 3 depicts one embodiment of a method for transporting customer QoS information via a PBB network.

As depicted in FIG. 3, a portion of the steps of method 300 are performed by an ingress PBB PE device (e.g., PBB PE device 111$_A$) and a portion of the steps of method 300 are performed by an egress PBB PE device (e.g., PBB PE device 111$_Z$).

At step 302, method 300 begins.

At step 304, the ingress PBB PE device receives a customer Ethernet frame from a customer device. The customer Ethernet frame includes a customer payload and a customer header. The customer header includes customer QoS information.

At step 306, the ingress PBB PE device identifies the customer QoS information in the customer header of the customer Ethernet packet.

At step 308, the ingress PBB PE device adds the customer QoS information to a service provider header of a service provider frame used for transporting the customer Ethernet frame via the PBB network.

In one embodiment, the customer QoS information is added to a service provider tag of the service provider header. In this embodiment, the service provider tag may be any suitable type of tag (e.g., an IEEE VLAN tag or any other suitable tag or header field).

The customer QoS information may be added to the service provider header in any suitable manner. In one embodiment, for example, customer QoS information may be copied into the service provider header. In one embodiment, for example, the customer QoS information may be processed in order to derive one or more values, representative of the customer QoS information, that are added to the service provider header. The customer QoS information may be maintained for transport via the PBB network in any other suitable manner.

At step 310, the ingress PBB PE device transmits the service provider frame (including the customer QoS information), via the PBB network, toward the egress PBB PE device.

At step 312, the egress PBB PE device receives the service provider frame (including the customer QoS information), via the PBB network, from the ingress PBB PE device.

At step 314, the egress PBB PE device extracts the customer QoS information from the service provider header of the service provider frame used for transporting the customer Ethernet frame via the PBB network.

In one embodiment, in which the customer QoS information is added to a service provider tag of the service provider header, the customer QoS information is extracted from that service provider tag. As described herein, the service provider tag may be any suitable type of tag (e.g., an IEEE VLAN tag or any other suitable tag or header field).

The customer QoS information may be extracted from the service provider header in any suitable manner. In one embodiment, for example, in which the customer QoS information is copied into the service provider header by the ingress PBB PE device, the customer QoS information may be read from the service provider tag. In one embodiment, for example, in which the customer QoS information is processed in order to derive one or more values, representative of the customer QoS information, that are added to the service provider header by the ingress PBB PE device, the customer QoS information may be determined by processing the one or more values in order to recover the original customer QoS information.

At step 316, the egress PBB PE device adds the customer QoS information to the customer header of the customer Ethernet frame (e.g., using one or more customer header fields suitable for transporting the customer QoS information, such as the customer header field(s) in which the customer QoS information was identified by the ingress PBB PE device or any other suitable tag(s) and/or field(s)).

At step 318, the egress PBB PE device transmits the customer Ethernet frame. The customer Ethernet frame is transmitted to a customer device. The customer Ethernet frame includes a customer payload and a customer header. The customer header includes the customer QoS information.

At step 320, method 300 ends.

In one embodiment, a PBB BVPLS has its associated PBB CoS represented using both the service (I-TAG) and tunnel CoS (BVID dot1p+DE or PW EXP bits), and the customer CoS is included within dot1q VLAN tags managed in the customer domains. In this embodiment, there may be one (e.g., CVID) or two (e.g., CVID, SVID) tags used to provide service classification at the AC. In this embodiment, IVPLS instances are used to provide a Carrier-of-Carrier service. In this embodiment, as the VLAN tags are stripped at the ingress PBB PE device and added back at the egress PBB PE device, the PBB implementation provides a way to maintain the customer QoS markings. In one such embodiment, this is done using a dot1q VLAN tag forwarding configuration on a per IVPLS basis under the node specifying the uplink to the related BVPLS where, when dot1q VLAN tag forwarding is enabled, a new service provider tag is added after the B-SNB-DA addresses. In one such embodiment, the dot1p and/or DE bits from the specified outer/inner customer VLAN tags are copied into the newly added service provider tag. In one such embodiment, once the dot1q VLAN tag forwarding is enabled in one IVPLS instance, it is enabled in all of the related instances. In this embodiment, at the remote PBB PE/BEB on the egress ACs or PWs, the service provider tag after the C-SA/C-DA addresses is removed and the dot1p and/or DE bits will be copied in the newly added customer VLAN tags.

Although primarily depicted and described herein with respect to embodiments in which the customer QoS transport capability is used to provide transparent transport of customer QoS information via a specific type of interface into a PBB network (namely, a Backbone PW interface), it will be appreciated that the customer QoS transport capability may be used to provide transparent transport of customer QoS information via any other suitable type(s) of interface(s) into a PBB network, such as a Backbone Attachment Circuit (B-AC) interface or any other suitable type of interface to a PBB network.

Although primarily depicted and described herein with respect to embodiments in which the customer QoS transport capability is used to provide transparent transport of customer QoS information via a specific type of provider network (namely, a PBB network), it will be appreciated that the customer QoS transport capability may be used to provide transparent transport of customer QoS information via any other suitable type(s) of network(s).

Figure 4:
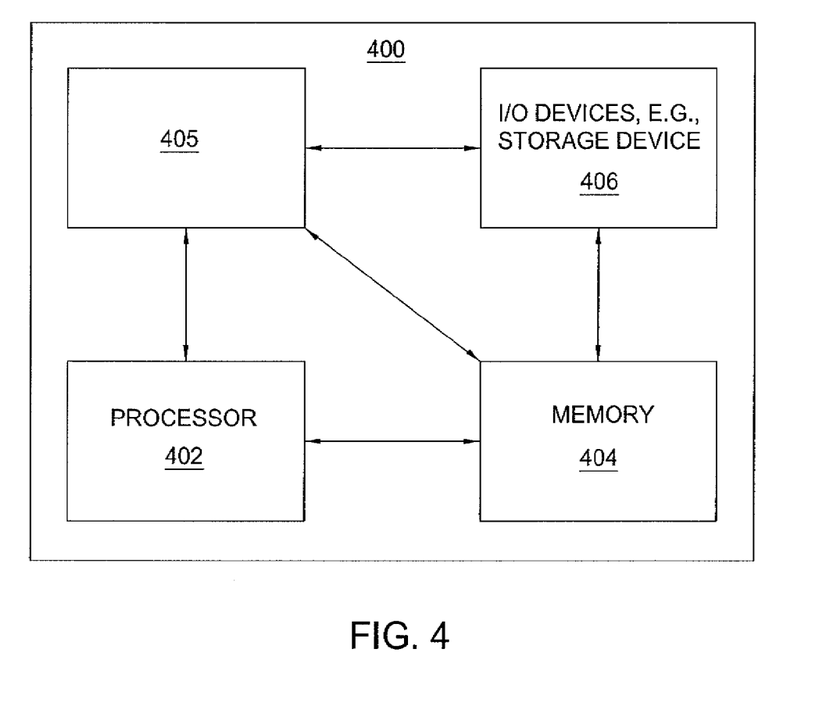
FIG. 4 depicts a high-level block diagram of a computer suitable for use in performing the functions described herein.

FIG. 4 depicts a high-level block diagram of a computer suitable for use in performing functions described herein.

As depicted in FIG. 4, computer 400 includes a processor element 402 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 405 can be loaded into memory 404 and executed by processor 402 to implement the functions as discussed herein. Thus, cooperating process 405 (including associated data structures) can be stored on a computer readable storage medium, e.g., RAM memory, magnetic or optical drive or diskette, and the like.

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one or more of a PBB PE device 111, one or more components of a PBB PE device 111, a CE device 121, and the like, as well as various combinations thereof.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for transporting quality-of-service (QoS) information, comprising:
   receiving, at a provider edge (PE) device configured as an ingress point to a Provider Backbone Bridging (PBB) network of a service provider, a customer Ethernet frame of a customer, the customer Ethernet frame comprising a customer payload and a customer header, wherein the customer header comprises at least one header field including customer QoS information specified for the customer Ethernet frame, the PE device comprising a customer-facing Virtual Private Local Area Network (LAN) Service (VPLS) instance and a provider-facing VPLS instance;
   extracting, by the customer-facing VPLS instance of the PE device, the customer QoS information from the at least one header field including the customer QoS information;
   providing, from the customer-facing VPLS instance of the PE device to the provider-facing VPLS instance of the PE device, the customer QoS information extracted by the customer-facing VPLS instance;
   stripping, by the customer-facing VPLS instance of the PE device, at least a portion of the customer header from the customer Ethernet frame to form thereby a modified customer Ethernet frame, the at least a portion of the customer header comprising the at least one header field including the customer QoS information;
   providing, from the customer-facing VPLS instance of the PE device to the provider-facing VPLS instance of the PE device, the modified customer Ethernet frame;
   forming, by the provider-facing VPLS instance of the PE device, a service provider frame comprising a service provider header and a service provider payload, the service provider payload comprising the modified customer Ethernet frame, the service provider header comprising the customer QoS information received by the provider-facing VPLS instance of the PE device from the customer-facing VPLS instance of the PE device; and
   providing the service provider frame from the PE device toward the PBB network.

2. The method of claim 1, wherein customer QoS information comprises at least one of Ethernet Class of Service (CoS) bits and a Discard Eligibility (DE) Indication bit.

3. The method of claim 2, wherein the Ethernet CoS bits are dot1p bits as defined by the IEEE 802.1p standard.

4. The method of claim 1, wherein the at least one header field including customer QoS information comprises at least one customer virtual local area network (VLAN) tag.

5. The method of claim 1, wherein the customer QoS information is added to a service provider tag of the service provider header.

6. The method of claim 5, wherein the service provider tag is an IEEE virtual local area network (VLAN) tag.

7. The method of claim 5, wherein the customer Ethernet frame comprises Customer Media Access Control (CMAC) addresses, wherein the service provider tag is placed after the CMAC addresses.

8. An apparatus for transporting quality-of-service (QoS) information, comprising:
   a processor and a memory communicatively connected to the processor, the processor configured for:
      receiving, at a provider edge (PE) device configured as an ingress point to a Provider Backbone Bridging (PBB) network of a service provider, a customer Ethernet frame of a customer, the customer Ethernet frame comprising a customer payload and a customer header, wherein the customer header comprises at least one header field including customer QoS information specified for the customer Ethernet frame, the PE device comprising a customer-facing Virtual Private Local Area Network (LAN) Service (VPLS) instance and a provider-facing VPLS instance;
      extracting, by the customer-facing VPLS instance of the PE device, the customer QoS information from the at least one header field including the customer QoS information;
      providing, from the customer-facing VPLS instance of the PE device to the provider-facing VPLS instance of the PE device, the customer QoS information extracted by the customer-facing VPLS instance;
      stripping, by the customer-facing VPLS instance of the PE device, at least a portion of the customer header from the customer Ethernet frame to form thereby a modified customer Ethernet frame, the at least a portion of the customer header comprising the at least one header field including the customer QoS information;
      providing, from the customer-facing VPLS instance of the PE device to the provider-facing VPLS instance of the PE device, the modified customer Ethernet frame;

forming, by the provider-facing VPLS instance of the PE device, a service provider frame comprising a service provider header and a service provider payload, the service provider payload comprising the modified customer Ethernet frame, the service provider header comprising the customer QoS information received by the provider-facing VPLS instance of the PE device from the customer-facing VPLS instance of the PE device; and providing the service provider frame from the PE device toward the PBB network.

9. The apparatus of claim 8, wherein customer QoS information comprises at least one of Ethernet Class of Service (CoS) bits and a Discard Eligibility (DE) Indication bit.

10. The apparatus of claim 9, wherein the Ethernet CoS bits are dot1p bits as defined by the IEEE 802.1p standard.

11. The apparatus of claim 8, wherein the at least one header field including customer QoS information comprises at least one customer virtual local area network (VLAN) tag.

12. The apparatus of claim 8, wherein the customer QoS information is added to a service provider tag of the service provider header.

13. The apparatus of claim 12, wherein the service provider tag is an IEEE virtual local area network (VLAN) tag.

14. The apparatus of claim 12, wherein the customer Ethernet frame comprises Customer Media Access Control (CMAC) addresses, wherein the service provider tag is placed after the CMAC addresses.

15. A method, comprising:

receiving, at a provider edge (PE) device configured as an egress point from a Provider Backbone Bridging (PBB) network of a service provider, a PBB encapsulated frame, wherein the PBB encapsulated frame comprises a customer Ethernet frame of a customer and a service provider header, wherein the customer Ethernet frame comprises a customer payload and a customer header, wherein the service provider header comprises customer quality-of-service (QoS) information specified for the customer Ethernet frame, the PE device comprising a provider-facing Virtual Private Local Area Network (LAN) Service (VPLS) instance and a customer-facing VPLS instance;

extracting, by the provider-facing VPLS instance of the PE device, the customer QoS information from the service provider header of the PBB encapsulated frame;

providing, from the provider-facing VPLS instance of the PE device to the customer-facing VPLS instance of the PE device, the customer QoS information extracted by the provider-facing VPLS instance;

stripping, by the provider-facing VPLS instance of the PE device, the service provider header of the PBB encapsulated frame to recover thereby the customer Ethernet frame;

providing, from the provider-facing VPLS instance of the PE device to the customer-facing VPLS instance of the PE device, the customer Ethernet frame;

forming, by the customer-facing VPLS instance of the PE device based on the customer Ethernet frame, a modified customer Ethernet frame, wherein forming the modified customer Ethernet frame comprises adding, within the customer header of the customer Ethernet frame, the customer QoS information received by the customer-facing VPLS instance of the PE device from the provider-facing VPLS instance of the PE device; and providing the modified customer Ethernet frame from the PE device toward a customer network.

16. The method of claim 15, wherein customer QoS information comprises at least one of Ethernet Class of Service (CoS) bits and a Discard Eligibility (DE) Indication bit.

17. The method of claim 15, wherein the customer QoS information is extracted from a service provider tag of the service provider header.

18. An apparatus, comprising:

a processor and a memory communicatively connected to the processor, the processor configured for:

receiving, at a provider edge (PE) device configured as an egress point from a Provider Backbone Bridging (PBB) network of a service provider, a PBB encapsulated frame, wherein the PBB encapsulated frame comprises a customer Ethernet frame of a customer and a service provider header, wherein the customer Ethernet frame comprises a customer payload and a customer header, wherein the service provider header comprises customer quality-of-service (QoS) information specified for the customer Ethernet frame, the PE device comprising a provider-facing Virtual Private Local Area Network (LAN) Service (VPLS) instance and a customer-facing VPLS instance;

extracting, by the provider-facing VPLS instance of the PE device, the customer QoS information from the service provider header of the PBB encapsulated frame;

providing, from the provider-facing VPLS instance of the PE device to the customer-facing VPLS instance of the PE device, the customer QoS information extracted by the provider-facing VPLS instance;

stripping, by the provider-facing VPLS instance of the PE device, the service provider header of the PBB encapsulated frame to recover thereby the customer Ethernet frame;

providing, from the provider-facing VPLS instance of the PE device to the customer-facing VPLS instance of the PE device, the customer Ethernet frame;

forming, by the customer-facing VPLS instance of the PE device based on the customer Ethernet frame, a modified customer Ethernet frame, wherein forming the modified customer Ethernet frame comprises adding, within the customer header of the customer Ethernet frame, the customer QoS information received by the customer-facing VPLS instance of the PE device from the provider-facing VPLS instance of the PE device; and providing the modified customer Ethernet frame from the PE device toward a customer network.

19. The apparatus of claim 18, wherein customer QoS information comprises at least one of Ethernet Class of Service (CoS) bits and a Discard Eligibility (DE) Indication bit.

20. The apparatus of claim 18, wherein the customer QoS information is extracted from a service provider tag of the service provider header.

* * * * *